Mar. 13, 1923.

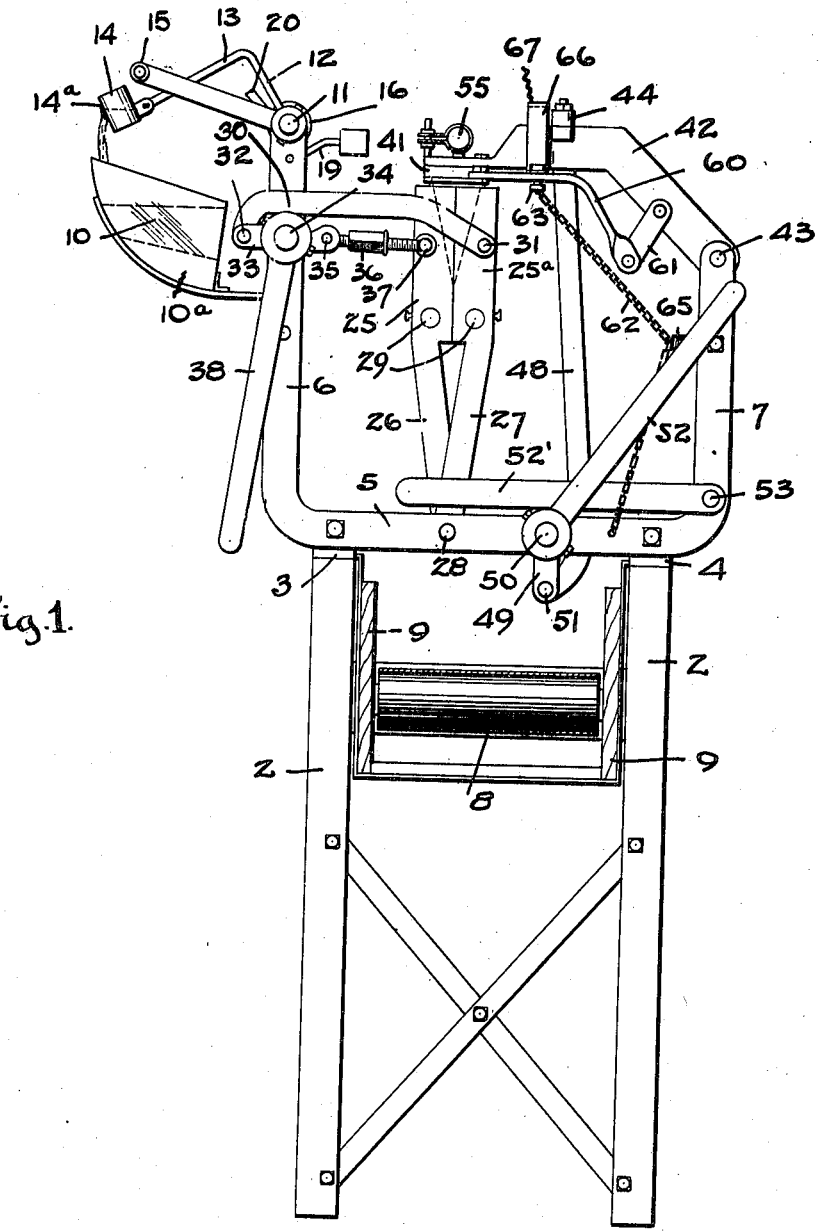

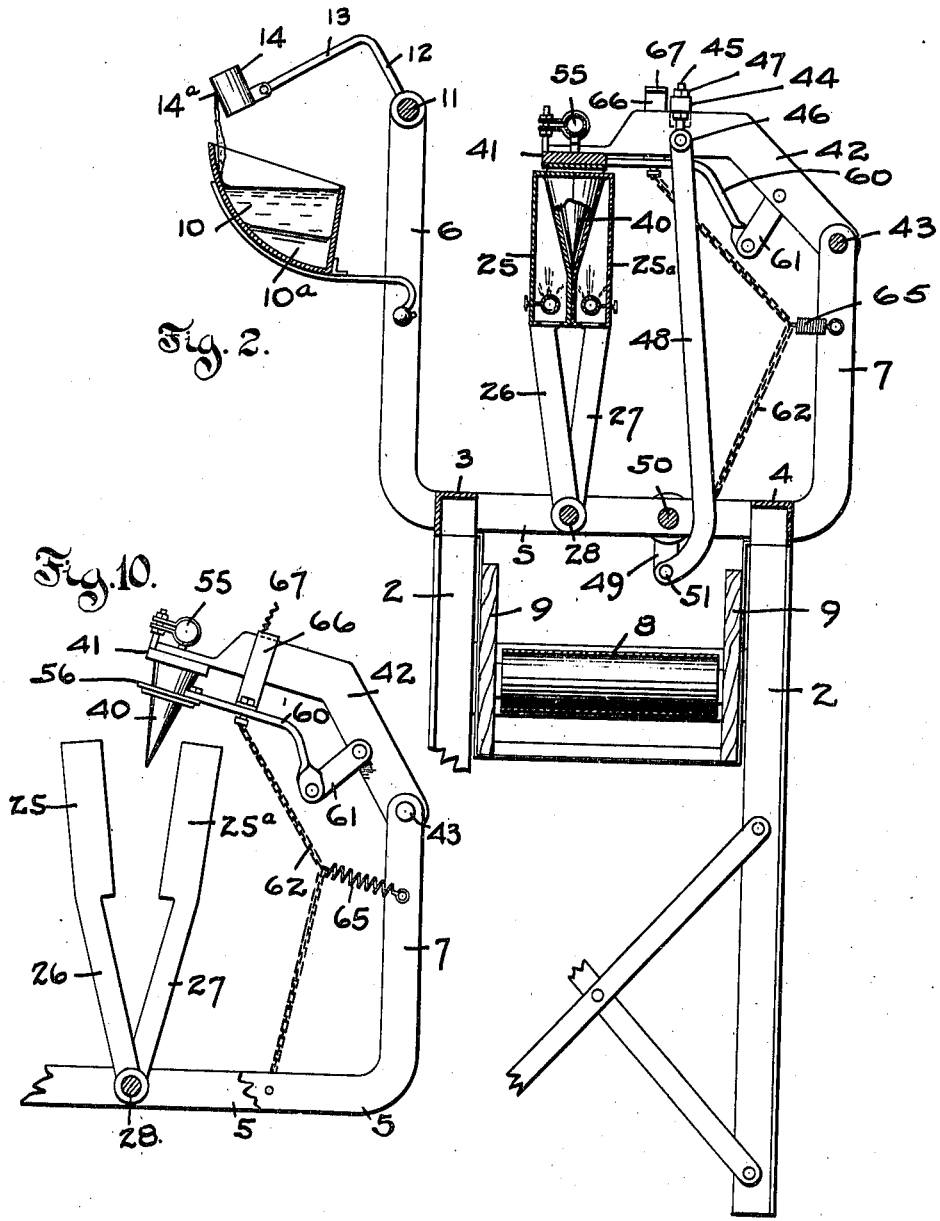

O. HAUGE ET AL 1,448,294

MACHINE FOR MAKING PASTRY SHELLS

Filed Dec. 13, 1920  5 sheets-sheet 3

Mar. 13, 1923.

O. HAUGE ET AL
MACHINE FOR MAKING PASTRY SHELLS
Filed Dec. 13, 1920

INVENTORS
OSCAR HAUGE
AND W<sup>m</sup>. A. ENGLAND
BY
White Prest Evans
their ATTORNEYS

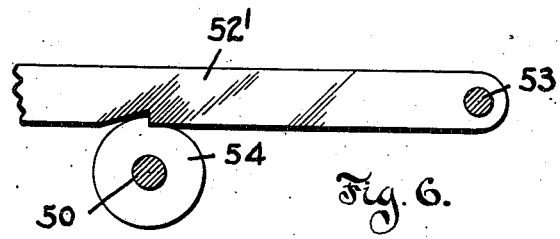
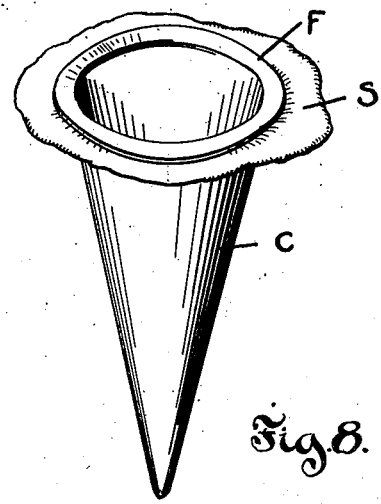
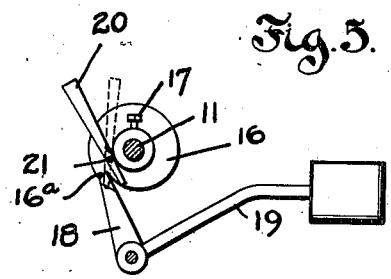
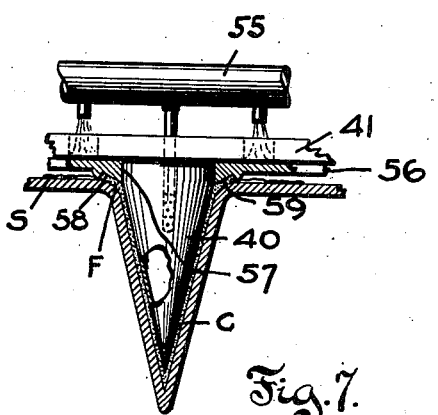
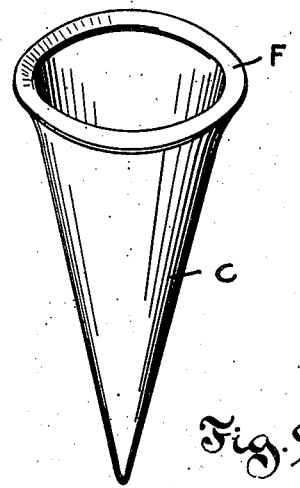

Patented Mar. 13, 1923.

1,448,294

UNITED STATES PATENT OFFICE.

OSCAR HAUGE AND WILLIAM A. ENGLAND, OF SAN FRANCISCO, CALIFORNIA, ASSIGNORS TO PARENT CONE COMPANY, OF SAN FRANCISCO, CALIFORNIA, A CORPORATION OF CALIFORNIA.

MACHINE FOR MAKING PASTRY SHELLS.

Application filed December 13, 1920. Serial No. 430,212.

*To all whom it may concern:*

Be it known that we, OSCAR HAUGE, a subject of the King of Norway, and WILLIAM A. ENGLAND, a citizen of the United States, both residents of the city and county of San Francisco and State of Caifornia, have invented a new and useful Machine for Making Pastry Shells, of which the following is a specification.

This invention relates to a machine for making pastry shells and more particularly to such as are commonly known as ice cream cones.

An object is to provide a machine that is highly efficient, extremely simple, but substantial and durable, and especially economical in the consumption of batter.

It is an object to provide for a close determination of the charges of batter for the molds of the machine, and to provide for the nearly complete withdrawal of the batter from a supply tank by mold loading dippers.

A further object is to provide for the effectual stripping of the baked cones from cores after mold sections have been withdrawn from the cores.

This invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and description as variations may be adopted within the scope of the invention as set forth in the claims.

Referring to the drawings: Fig. 1 is an end elevation of the machine.

Fig. 2 is a vertical section transversely of the machine.

Fig. 3 is a plan, partly in section.

Fig. 5 is a sectional detail of the dipper lock.

Fig. 6 is a detail of the core carrier lock.

Fig. 7 is a detail of the stripper.

Figs. 8 and 9 are perspectives of cones.

Fig. 10 shows the mechanism in stripping position.

Figure 4:
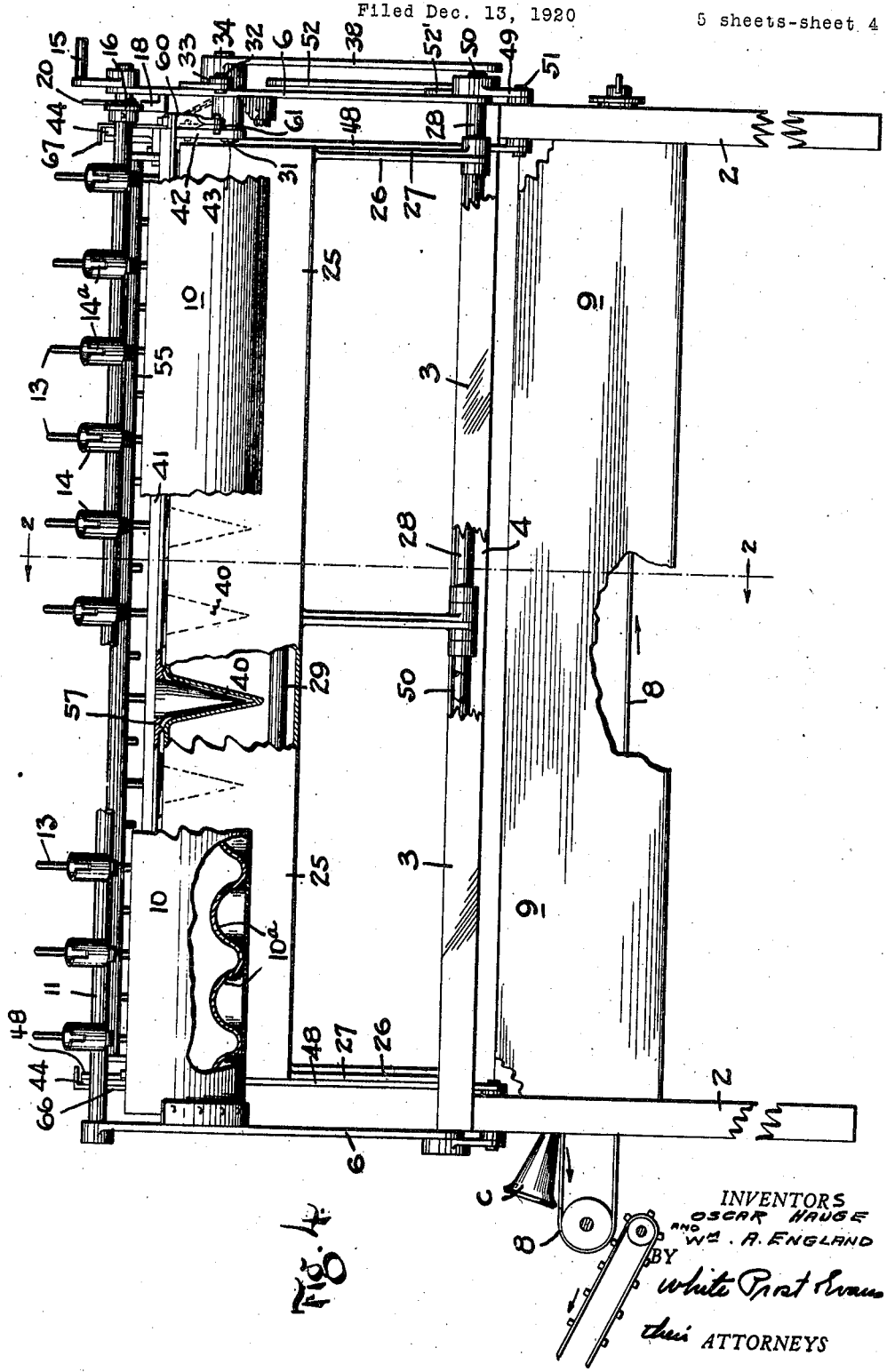
Fig. 4 is a front elevation partly in section; line 2—2 indicating the plane of Fig. 2.

The present invention involves a simple, but novel, supply tank into which there is submersible a gang of dippers designed and adjustable so as to transfer charges of batter of predetermined and variable quantity to a mold. The invention further involves a mold comprising separable mold plates, each having a series of half matrices, closable to receive a charge of batter. There is further included a gang of mold cores arranged on a carrier by which they are moved into the mold members to form therewith a series of shell producing matrices.

Means are provided for heating the mold member and, also, means are provided for operating the various parts from filling to discharge of the matrix chamber. Further, means are included which form a soft or yielding cushion bed on which the baked shells may be precipitated and thereby transferred to a suitable conveyor or receptacle.

The operative parts of the machine are mounted upon a simple and suitable frame including corner legs 2—2 connected by front and rear cap plates 3 and 4 having transverse U-shaped end frames each of which has a cross bar 5 and front and back posts 6 and 7. Beneath the cross-bars and between the corner legs is arranged a belt-conveyor 8 which forms a soft or yielding table to which the cooked shells fall and by which they are conveyed away. At the edges of the belt are side boards 9—9.

On one side of the frame posts 6 is supported a longitudinal trough 10 having a bottom curved concentric to a rock shaft 11 journalled in the posts 6. On this rock shaft is a gang of levers 12 of L-shape so that the arm 13 of each lever will swing close and parallel to the rear wall of the tank. At the end of each arm 13 is attached a round cup or dipper 14 which, when the rock shaft is turned by its handle or crank 15, will sweep into the tank 10, moving close to its bottom and thus agitating the batter placed therein.

A feature of the invention is to secure the close regulation of the dipper load to be transferred thereby to cooking means. This is accomplished by providing means enabling the holding of all of the dippers at different angles as between their axes and the vertical so that the mouths of the dippers will determine the level of the batter charge according to the obliquity of the dippers.

Each dipper has a mouth 14ª on its side remote from the arm 13 and through this mouth the excess batter will drain from the dipper after it has been withdrawn from the tank.

To prevent appreciable waste of batter the bottom of the tank is transversely corrugated or formed with pockets 10ª of a depth that the dippers will fully enter and thus drain the tank to the bottom of the pockets.

As the dippers are withdrawn from the tank they are locked by suitable means in a predetermined position to rest and drain. This position is variable to secure the desired obliquity of the dippers. A form of locking means includes a disc 16 adjustably secured on shaft 11 by a set screw 17 and having a peripheral notch 16ª. Pivoted on one of the posts 6 is a pawl 18 having its swinging end bearing on the periphery of the disc 16, the pawl being pressed thereon as by a weighted arm 19. When the disc 16 turns with the shaft 11 to bring the notch 16ª to the pawl this will snap in and as the handle 15 is released the weight of the dipper and arm 12—13 tend to roll the shaft back against the lock means 16—18. From this it will be seen that the obliquity of the dippers may be adjusted by the angular setting of the notched disc 16, the more upright the axis of the dippers the larger the retained load.

Rotation of the shaft 11 from its locked position will swing the dippers over the shaft and down toward a mold structure in which are formed cavities of the desired shape into which the loads from the dippers are discharged, after which the dippers are thrown back into the tank and refilled. To clear the pawl from the discs 16 on this return action past the pawl 18 there is, on one side of the disc, a kicker 20 in the form of a rod on a pivot 21 the long end of the rod tilting toward the hub of the disc when this is rotated slowly contraclockwise so that the point of the rod projects toward the end of the pawl 18 and kicks it away from the disc thus letting the shaft 11 rotate until the dippers enter the pockets of the tanks. The kicker rod is so overbalanced on its pivot that after it kicks off the pawl this can return to bear on the disc and again lock it when the dippers are lifted from the tank to draining position.

The mold mechanism includes a pair of complementary longitudinally extending matrix plates 25 and 25ª having plane meeting faces in which are provided a series of semi-conical recesses forming, when the plates are in closed position conical pockets or chambers opening upwardly. These plates 25 and 25ª are mounted on the swinging ends of respective carrier arms 26 and 27 which swing about a common axis or fulcrum rod 28 in the cross arm 5 of the frame. The lower portions of the matrix plates 25 and 25ª are provided with suitable burners 29 so that by the combustion of fuel the matrix or chamber walls will be suitably heated. The matrix plates 25 and 25ª are concurrently and oppositely operable to an opening position by suitable means comprising a pair of upper bowed links 30 which are pivoted at 31 to the ends of the matrix plate 25ª and are also pivoted at 32 to short lever arms 33 extending forwardly upon a rock shaft 34 mounted in the post 6 somewhat below the rock shaft 11. Diametrically opposite to the short levers 33 are levers 35 to which are pivotally connected short and adjustable toggle links 36 that are pivoted at 37 to the ends of the matrix plate 25. Extending downwardly from the shaft 34 is operating lever 38 which when pulled forward and upwardly from the position shown in Fig. 1 will so actuate the links 30 and 36 as to spread the plates 25 and 25ª from each other in a swinging movement on their fulcrum 28.

While the mold or matrix plates 25 and 25ª are in their closed position the operator or attendant may then swing the loaded dippers 14 from the draining position over toward and above the open mouth of the matrix chambers in the mold plates and discharge the contents of the dippers into the chambers.

For the formation of a conical baked shell in each of the matrix chambers it is necessary to introduce into the chambers a conical core or central body and if the matrix plates 25 and 25ª are provided with a plurality of matrix forming pockets or chambers then the machine also embodies a number of cores complementary to the several matrix chambers. As here shown a gang of cores 40 is securely arranged on the lower face of longitudinally extending carrier bar 41 which in turn is secured to the swinging ends of a set of carrier arms 42 of somewhat angular form and whose rear and lower ends are arranged on a fulcrum rod 43 in the upper ends of the back post 7; the position of the fulcrum rod 43 with respect to the plates 25 and 25ª being such that the cores 40 can be moved into and out of the matrix chambers in an arc whose chord is substantially vertical and forms the axis of the conical matrix chambers. The carrier levers 42 are connected by a longitudinally extending frame forming bar 44 through which extends an adjustable hanger including a threaded stem 45 having an eye 46 at its lower end; the stem having lock nuts 47 above and below the bar 44. Connected to the eye 46 is link 48 reaching downwardly and passing to one side of a rock shaft 50 secured to which is a short lever arm 49 pivoted at 51 to the lower end of the link 48. Secured to the rock shaft 50 is an operating lever 52 which when pulled forwardly causes the lever 49 to lift the link 48 and the carrier frame or structure including the longitudinal plate 41 to which the gang of cores 40 is secured. When the core carrier is in its elevated position with the operating handle 52 forward the rock shaft 50 is locked by a detent or latch member 52' fulcrummed at its rear at 53 on the bottom portion of the post 7. The latch member 52' interlocks with an element in the form of a shoulder disk 54 secured on the shaft 50.

While the core carrier is in the elevated position the attendant charges the batter into the matrix chambers and returns the dippers 14 for another charge and sets the dippers in the draining position and thereafter releases the latch 52' by lifting it from the locking disc 54 so that the operating lever 52 may be pushed rearwardly to lower the cores 40 into the matrix chambers.

The several cores 40 are hollow and they and the top plate or bar 41 are heated by a longitudinally extending burner 55. The several burners 29 and 55 support a continuous fire during a desired period of operation of baking a number of the shells or cones; the fires at the burners not being extinguished during the alternate loading and unloading intervals in the operation.

After the gang of cores 40 has been lowered into the matrix chambers and the cores express the batter therein and substantially fill the annular cone-like chamber produced between the inner faces of the matrix pocket and the outer surface of the cores, the several elements forming the mold chambers are held in relatively closed position for a period of time necessary to provide for the cooking of the batter and the formation of a substantial, brittle shell. After the necessary cooking time has elapsed the complementary mold plates 25 and 25$^a$ are slightly separated by pulling forwardly lever 38 and then the operating lever 52 is pulled forwardly so as to elevate the carrier frame and gang of cores on which latter are carried the cooked shells.

It is desirable to automatically strip the shells from the cores so that the shells will fall freely to the yielding conveying belt 8 and thence be carried away. An extremely efficient and practical form of stripping device is here shown as including a longitudinally extending strip or plate 56 having spaced apertures 57 thru which extend the cores 40. Around each of the apertures is an annular ridge or bead 58 within which there is formed an annular depression 59 which is filled with the expressed batter when the cores 40 plunge into the batter in the matrix pocket; this annular depression within each of the beads 58 therefore forming on the completed cone an annular laterally extending collar the outer portion of which is cut sharply providing a frangible, readily removed fringe portion which is the result of an excess charge of material that is displaced by the cores from the matrix chambers. An untrimmed cone as it comes from the machine is illustrated in Fig. 8, and the trimmed cone is shown in Fig. 9, in which the cone body is designated at C with its collar or flange shown at F, the excess fringe or scrap S having been removed.

The mold plates 25 and 25$^a$ having been slightly opened and the carrier with the cores 40 having been moved upwardly by the lever 52 stripping of the cores is secured during this movement by the downward pulling of the stripper plate 56 which is secured to a set of lever or carrying arms 60 pivoted to downwardly extending brackets 61 attached to or provided on suitable carrier frame members 42. The adhesion of the baked cones to the cores 40 will cause the stripper plate 56 to be carried upwardly with the cores until sufficient tension is produced in a draft device such as a set of chains 62 attached at 63 to the arms 60 and also attached to a suitable fixed portion as the cross bars 5 of the frame. The several chains 62 have a considerable degree of slackness and this partly taken up by springs 65 connecting the chain as to a contiguous portion such as the back post 7. When the tension of the draft chains 62 on the stripper plate 56 is sufficient during the upward movement of the carrier bar 41 then the several cones will be stripped from the cores 40 and will fall between the open matrix plates 25 and 25$^a$ onto the belt 8. The downward movement of the stripper carrying arms 60 after the cones have been stripped from the cores is limited by suitable device comprising a set of brackets 66 having overhanging ends 67 designed to engage the adjacent upper edge of the carrier arms 42.

From the above it will be seen that after the closed matrix plates 25 and 25$^a$ have been charged with loads of batter from the several dippers 14 the carrier bar 41 is lowered so that the cores 40 will enter the matrix chambers and it is during this downward movement that the stripper plate 56 will engage and rest freely upon the top of the matrix plates 25 and 25$^a$ immediately following which the carrier bar 41 moves into juxtaposition toward the top of the stripper plate 56. The proximity of the carrying bar 41 with respect to the stripper may be nicely determined by means of the adjustable device including the eye 46 and its stem 45 which is connected to the operating link 48.

What is claimed is:

1. In a molding machine, a mold including matrix devices, a supply tank at one side thereof, and a dipper mechanism including a dipping device to gather a load in said tank and charge it into the mold.

2. In a molding machine, a mold including matrix devices, a supply tank at one side thereof, and a dipper mechanism including a dipping and gaging device to gather a load in said tank and charge it into the mold.

3. In a molding machine, an open mouth mold, a core device movable into and out of the mold, and a dipper device for taking a load from a source and discharging it into the mold thru the mouth of the mold.

4. In a molding machine, a supply tank, an open mouth mold, a core movable into and from the mold mouth, and a dipper operative between the supply tank and the mold to charge the latter when the core is removed.

5. In a molding machine, an open mouth mold, a supply tank on one side of the mold, a core device on the other side of the mold, means for moving said device to clear it of and insert it in the mold, and a dipper device operative between the tank and mold to charge the latter when the core device is clear thereof.

6. In a molding machine, an open mouth mold device having a matrix chamber, a supply tank, and a dipper operatively arranged between the mold and the tank for charging the former from the latter.

7. In a molding machine, an open mouth mold device having a matrix chamber, a supply tank, and a gaging dipper operatively arranged between the mold and the tank for charging the former from the latter.

8. In a molding machine, an open mouth mold device having a matrix chamber, a supply tank, a dipper operatively arranged between the mold and the tank for charging the former from the latter, and means for holding the dipper at various degrees of obliquity to regulate its charge by draining.

9. In a molding machine, an open mouth mold device having a matrix chamber, a supply tank, a dipper operatively arranged between the mold and the tank for charging the former from the latter, and adjustable means for holding the dipper at various degrees of obliquity to regulate its charge by draining.

10. In a machine for molding pastry, a supply tank for batter, a mold having a series of matrix chambers with open mouths at their tops, a set of cores movable into and out of the mouths, and a gang of dippers for transferring batter to the mold chambers from the tank when the cores are withdrawn.

11. In a molding machine, a dipper for transferring a fluid from a source of supply to a mold chamber, said dipper having a draining mouth in its side.

12. In a molding machine, a dipper for transferring a fluid from a source of supply to a mold chamber, said dipper having a draining mouth in its side, and means for holding the dipper at various degrees of obliquity to regulate the volume of the dipper load.

13. In a molding machine, a gang of dippers each having a discharge mouth, a rock shaft to which the dippers are connected in substantially symmetrical relation, and means for retaining said shaft in selective positions to regulate the volume of the load in each dipper.

14. In a molding machine, a gang of dippers each having a discharge mouth, a rock shaft to which the dippers are connected in substantially symmetrical relation, and means for retaining said shaft in selective positions to regulate the volume of the load in each dipper, the drain mouth of each dipper extending down its side.

15. In a molding machine, a supply tank, and a gang of symmetrically arranged dippers, the tank bottom having pockets into which the dippers closely pass to substantially exhaust the charge of substance being gathered therefrom.

16. In a molding machine, a supply tank, and a gang of symmetrically arranged dippers movable in an arc to a loading position in the tank, the latter having a bottom curved to approximate the arc of movement so that the mouths of the dippers sweep close to the bottom.

17. In a molding machine a supply tank, and a gang of symmetrically arranged dippers movable in an arc to a loading position in the tank, the latter having a bottom curved to approximate the arc of movement so that the mouths of the dippers sweep close to the bottom and the bottom being provided with pockets into which the dippers dip.

18. In a machine, a mold consisting of a pair of mold sections having co-operative faces with half-matrix openings, means for closing and opening the sections and including a rock-shaft having sets of crank levers, and toggle links connected to said lever and to the ends of respective sections.

19. In a baking machine, a mold consisting of a pair of mold sections having co-operative faces with half-matrix openings, means for closing and opening the sections and including a rock-shaft having sets of crank levers, and toggle links connected to said levers and to the ends of respective sections, the sections being movable about an axis in the meeting plane of the sections.

20. In a machine, a mold consisting of a pair of mold sections having co-operative faces with half-matrix openings, means for closing and opening the sections and including a rock-shaft having sets of crank levers, and toggle links connected to said levers and to the ends of respective sections, the sections having carrier arms converging toward an axis in the meeting plane of the sections.

21. In a baking machine, sets of carrier arms operative on a common axis, a pair of baking mold sections arranged on said arms to meet in a plane passing along the axis, and means for closing and opening the sections in opposite, simultaneous movements about the axis, said means including pairs of links attached to respective sections of the mold and a rock shaft to which the links are attached.

In testimony whereof, we have hereunto set our hands.

OSCAR HAUGE.
WILLIAM A. ENGLAND.